US006335090B1

(12) United States Patent
Shirai et al.

(10) Patent No.: US 6,335,090 B1
(45) Date of Patent: Jan. 1, 2002

(54) PRESSURE-SENSITIVE ADHESIVE AND SURFACE PROTECTING MATERIAL COMPRISING AN ISOBUTYLENE POLYMER

(75) Inventors: Mitsuyoshi Shirai; Keiji Hayashi; Kenichi Shibata; Mitsuru Horada; Tsuyoshi Inoue; Kenji Sano, all of Osaka; Komaharu Matsui, Kanagawa; Takeshi Eda; Hiroshi Ueda, both of Hyogo, all of (JP)

(73) Assignees: Nitto Denko Corporation, Osaka; Kansai Paint Co., Ltd., Hyogo, both of (JP)

( * ) Notice: Subject to any disclaimer, the term of this patent is extended or adjusted under 35 U.S.C. 154(b) by 0 days.

(21) Appl. No.: 09/277,946

(22) Filed: Mar. 29, 1999

(30) Foreign Application Priority Data

Mar. 31, 1998 (JP) ............................................ 10-105475

(51) Int. Cl.$^7$ .................................................. B32B 7/06
(52) U.S. Cl. ...................... 428/343; 428/355 R; 428/356
(58) Field of Search ............................. 428/343, 355 R, 428/356

(56) References Cited

U.S. PATENT DOCUMENTS

| 2,463,452 | A | 3/1949 | Yule |
| 5,601,917 | A | 2/1997 | Matsui et al. ............... 428/356 |
| 5,612,135 | A | 3/1997 | Matsui et al. ............... 428/343 |
| 5,747,132 | A | 5/1998 | Matsui et al. ............... 428/41.7 |
| 5,810,960 | A | 9/1998 | Matsui et al. ............... 156/305 |

FOREIGN PATENT DOCUMENTS

| DE | 1 594 176 | 8/1969 |
| DE | 1 569 269 | 1/1971 |
| EP | 0 670 357 A1 | 9/1995 |
| EP | 0 839 886 A2 | 5/1998 |

OTHER PUBLICATIONS

Patent Abstracts of Japan, Publication No. 57 117534 vol. 006, No. 214 (Jul. 22, 1982).
European Search Report.
Patent Abstracts of Japan –57117534 (Jul. 22, 1982).
European Search Report dates Sep. 18, 2001.

*Primary Examiner*—Necholus Ogden
(74) *Attorney, Agent, or Firm*—Sughrue Mion, PLLC

(57) ABSTRACT

A pressure-sensitive adhesive comprising 100 parts by weight of an isobutylene polymer and 0.001 to 5 parts by weight of at least one release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof; and a surface protecting material having a pressure-sensitive adhesive layer comprising the adhesive. The adhesive has well-balanced characteristics in initial adhesion, retention of initial adhesion, and weather resistance.

5 Claims, No Drawings

PRESSURE-SENSITIVE ADHESIVE AND SURFACE PROTECTING MATERIAL COMPRISING AN ISOBUTYLENE POLYMER

FIELD OF THE INVENTION

This invention relates to a pressure-sensitive adhesive and a surface protecting material which exhibit good initial adhesion, retention of the initial adhesion, and excellent weather resistance and can easily be removed after long-term adhesion.

BACKGROUND OF THE INVENTION

A surface protecting material comprising a substrate and a pressure-sensitive adhesive layer comprising an isobutylene polymer as a base polymer is known. Compared with acrylic or natural rubber-based pressure-sensitive adhesive layers, polyisobutylene-based pressure-sensitive adhesive layer hardly increases its adhesiveness with time even when exposed to sunlight so that it is easily removed from an adherend surface without leaving the adhesive, which is advantageous for use as a surface protecting material. On the other hand, the initial adhesive strength of the polyisobutylene-based pressure-sensitive layer is sacrificed to adhesion retention and weather resistance. Therefore, it has been difficult to secure adhesion retention and weather resistance in good balance with initial adhesion.

SUMMARY OF THE INVENTION

An object of the present invention is to provide a polyisobutylene-based pressure-sensitive adhesive and a surface protecting material comprising the same which exhibit satisfactory initial adhesion, retention of the initial adhesion, and weather resistance in good balance and is easily removable without leaving the adhesive on the adherend surface even after long-term adhesion.

The present invention provides a pressure-sensitive adhesive comprising 100 parts by weight of an isobutylene polymer and 0.001 to 5 parts by weight of at least one release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof.

The present invention also provides a surface protecting material comprising a substrate having thereon a pressure-sensitive adhesive layer comprising the above-described pressure-sensitive adhesive.

The release control agent used in the invention exhibits high polarity due to the existence of oxygen atoms having high electronegativity. It is localized in the vicinities of the adhesive layer interface based on its high polarity in a peculiar compatible state to form a layer having weak cohesion in the vicinities of the adhesive interface. By the action of this layer, there are provided a pressure-sensitive adhesive having well-balanced adhesion characteristics including initial adhesion, weather resistance, and retention of the initial adhesion and a removable surface protecting material which exhibits satisfactory adhesion, retains the initial adhesion for a long time and is easily removed without leaving the adhesive.

DETAILED DESCRIPTION OF THE INVENTION

The pressure-sensitive adhesive according to the invention essentially comprises 100 parts by weight of an isobutylene polymer and 0.001 to 5 parts by weight of a release control agent selected from the group consisting of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof. The surface protecting material according to the invention comprises a substrate having thereon a pressure-sensitive adhesive layer comprising the pressure-sensitive adhesive of the invention.

The isobutylene polymer which can be used as a base polymer of the pressure-sensitive adhesive includes an isobutylene homopolymer and an isobutylene-isoprene random copolymer (i.e., butyl rubber) or a vulcanized or modified product thereof, such as regular butyl rubber, halogenated (e.g., chlorinated or brominated) butyl rubber, and partially crosslinked butyl rubber.

The modified butyl rubber also includes one prepared by introducing a functional group, such as a hydroxyl group, a carboxyl group, an amino group or an epoxy group, into the random copolymer. Isobutylene polymers preferred for weather resistance, etc. include an isobutylene homopolymer, an isobutylene-isoprene random copolymer having an isoprene content of 0.5 to 3% by weight and its vulcanized or modified product. An isobutylene homopolymer is particularly preferred. These isobutylene polymers can be used either individually or as a combination of two or more thereof.

The release control agent which can be used in the invention comprises at least one of an alcohol having a molecular weight of 90 to 300 and an oxygen atom content of 8.5% or more or a derivative thereof and a carboxylic acid having a molecular weight of 70 to 400 and an oxygen atom content of 11% or more or a derivative thereof.

The release control agent having high polarity, which is assigned to the high electronegativity of oxygen, exhibits compatibility to the isobutylene base polymer and is localized, when formulated as a pressure-sensitive adhesive layer, in the adhesive interface in a peculiar compatible state.

From the viewpoint of compatibility (which assures that the release control agent be retained in the adhesive layer without bleeding and exhibit satisfactory properties in forming the above-mentioned peculiar compatible state), improved adhesion, and long-term retention of the adhesion characteristics, a preferred release control agent is selected from an alcohol having a molecular weight of 100 or more, particularly 110 or more, especially 120 or more, a derivative of such an alcohol, a carboxylic acid having a molecular weight of 80 or more, particularly 90 or more, especially 100 or more, and a derivative of such a carboxylic acid.

An alcohol whose molecular weight is smaller than 90 or a derivative thereof or a carboxylic acid whose molecular weight is smaller than 70 or a derivative thereof would be lost through vaporization, etc., and the amount of the release control agent localized in the vicinities of the adhesive interface would be insufficient. It follows that the adhesion retention properties are reduced to impair removability. Where an alcohol or a derivative thereof whose molecular weight exceeds 300 or a carboxylic acid or a derivative thereof whose molecular weight exceeds 400 is used as a release control agent, the layer formed - of the agent localized in the vicinities of the interface would have too high a cohesive force, which ruins the removability.

If the oxygen atom content of the alcohol or alcohol derivative is less than 8.5%, or if that of the carboxylic acid or carboxylic acid derivative is less than 11%, the polarity is insufficient for making a clear difference from the polarity of the isobutylene polymer. As a result, a peculiar compatible state of the release control agent is hardly manifested in the vicinities of the adhesive interface, failing to accomplish the object of the invention. The oxygen atom content as referred to herein is calculated from equation:

Oxygen atom content (%)=(16A/Mw)×100 wherein A is the number of oxygen atoms present per molecule of the alcohol or alcohol derivative or the carboxylic acid or carboxylic acid derivative; and Mw is the molecular weight of the alcohol or a derivative thereof or the carboxylic acid or a derivative thereof.

The alcohol having a molecular weight of 90 to 300 and an oxygen atom content of 8.5% or more includes 1,1-cyclohexanediol, 3,3,5-trimethyl-1,1-cyclohexanediol, 2-methyl-2-pentanol, 2-(4-isopropylphenyl)-2-propanol, 2-hexyl-2-propanol, and 2-phenyl-2-propanol. The alcohol derivative includes esters formed of the above-enumerated alcohol component.

The carboxylic acid having a molecular weight of 70 to 400 and an oxygen atom content of 11% or more includes isobutyric acid, caprylic acid, succinic acid, benzoic acid, toluylic acid, and isophthalic acid. Benzoic acid is particularly preferred for the ease in compounding. The carboxylic acid derivative includes salts and esters of the above-enumerated carboxylic acids, such as triethylammonium benzoate.

As stated above, the alcohol or a derivative thereof or the carboxylic acid or a derivative thereof can be used either individually or as a combination of two or more selected therefrom. The alcohol and/or a derivative thereof and the carboxylic acid and/or a derivative thereof can be used in combination. The release control agent is used in an amount of 0.001 to 5 parts by weight per 100 parts by weight of the isobutylene polymer.

If the amount of the release control agent is less than 0.001 part, the effect expected of compounding is insufficient to secure satisfactory adhesion retention and releasability. If it exceeds 5 parts, the initial adhesion is insufficient for adhesion to an adherend.

From the standpoint of the balance among weather resistance, adhesion retention, and initial adhesion, a preferred amount of the release control agent is 4.5 parts by weight or smaller, particularly 4 parts by weight or smaller, especially 0.002 to 2 parts by weight, per 100 parts by weight of the isobutylene polymer.

The pressure-sensitive adhesive of the invention is prepared by mixing the components in an appropriate manner, for example, by mixing the isobutylene polymer and the release control agent in an appropriate solvent, such as toluene, hexane, cyclohexane or heptane. If desired, the pressure-sensitive adhesive may contain various acceptable additives, such as pigments, fillers, antioxidants, and ultraviolet absorbers as long as the above-described effects in developing the peculiar compatible state and manifesting satisfactory adhesion characteristics are secured.

The surface protecting material according to the invention comprises a substrate having formed thereon a pressure-sensitive adhesive layer comprising the above-described pressure-sensitive adhesive. The surface protecting material is prepared by any known method commonly employed for formation of an adhesive sheet, for example, by coating a substrate with a solution of the pressure-sensitive adhesive or a molten pressure-sensitive adhesive or by once forming an adhesive layer on a release separator in the same manner as described above and then transferring the adhesive layer onto a substrate.

The substrate which can be used in the invention is not particularly limited, and any substrate known in the art can be employed. For example, a plastic film of polyolefins, e.g., propylene polymers, ethylene polymers or mixtures thereof, polyvinyl chloride polymers or polyesters; an air-permeable porous film, paper, and nonwoven fabric are employable. In particular, polyolefin films are preferred.

If desired, the surface of the substrate on which the adhesive layer is to be provided can be subjected to an appropriate surface treatment, such as a corona treatment or primer coating, to improve the adhesion, etc. of the adhesive layer to the substrate. Further, the substrate may contain a slip agent, an antistatic agent, an antioxidant, and the like, if desired.

While not limiting, the substrate usually has a thickness of 5 to 300 $\mu$m, preferably 200 $\mu$m or smaller, still preferably 10 to 100 $\mu$m, and the pressure-sensitive adhesive layer usually has a thickness of 1 to 200 $\mu$m, preferably 100 $\mu$m or smaller, still preferably 1 to 50 $\mu$m.

If necessary, the exposed surface of the adhesive layer may be protected with a separator, etc. until use, or the surface protecting material may be rolled up without a separator. The substrate of the separator and of the surface protecting material to be rolled up is surface treated with an appropriate release agent, such as a silicone, fluorine or long-chain acrylic release agent. Where the surface protecting material is rolled up, the back side of the substrate, with which the adhesive layer is brought into contact, is surface treated with the release agent.

The pressure-sensitive adhesive and the surface-protecting material of the invention are preferably applied to a variety of adherends, such as coated plates, metallic plates, resin plates, decorative laminates, and automobile bodies and parts. They are particularly useful in applications demanding excellent adhesion, resistance to change in adhesion with time, removability without leaving the adhesive, and weather resistance. The weather resistance specifically means resistance to deterioration by exposure to sunlight, for example, reduction in adhesion characteristics even in outdoor weathering during transportation or laying operation so that the adhesive layer may be removed without contaminating the adherend with any remaining adhesive.

The invention will now be illustrated in greater detail with reference to Examples, but it should be understood that the invention is not limited thereto. Unless otherwise noted, all the parts are by weight.

EXAMPLE 1

In 700 parts of toluene were dissolved 80 parts of polyisobutylene having a weight average molecular weight (Mw) of 870,000 (on polystyrene calibration in gel-permeation chromatography; hereinafter the same) and 20 parts of polyisobutylene having an Mw of 30,000. Two parts of 2-phenyl-2-propanol (molecular weight: 136; oxygen atom content: 11.8%) were added to the polymer solution to prepare a pressure-sensitive adhesive. The adhesive was applied to a 40 $\mu$m thick film of polypropylene/polyethylene (⅕ by weight) and dried at 120° C. for 3 minutes to prepare a surface protecting material with a 10 $\mu$m thick pressure-sensitive adhesive layer.

The gel-permeation chromatography for molecular weight measurement was carried out on 4 columns (TSK gel G2000H HR, G3000H HR, G4000H HR, and GMH-H HR; manufactured by Tosoh Corporation) connected in series under the following conditions.

Eluent: tetrahydrofuran

Flow rate: 1 ml/min

Temp.: 40° C.
Sample concentration: 0.1 wt % in tetrahydrofuran
Sample pour: 500 μl
Detection: differential refractometer

EXAMPLE 2

A surface protecting material was prepared in the same manner as in Example 1, except that the pressure-sensitive adhesive was prepared by using 0.002 part of benzoic acid (molecular weight: 122; oxygen atom content: 26.2%) in place of the 2-phenyl-2-propanol.

EXAMPLE 3

A surface protecting material was prepared in the same manner as in Example 1, except that the pressure-sensitive adhesive was prepared by adding 1 part of 1,1-cyclohexanediol (molecular weight: 116; oxygen atom content: 27.6%) to a solution of 70 parts of polyisobutylene (Mw: 870,000) and 30 parts of polyisobutylene (Mw: 90,000) in 700 parts of toluene.

EXAMPLE 4

A surface protecting material was prepared in the same manner as in Example 3, except that the pressure-sensitive adhesive was prepared by using 0.01 part of succinic acid (molecular weight: 118; oxygen atom content: 54.2%) in place of the 1,1-cyclohexanediol.

Comparative Example 1

A surface protecting material was prepared in the same manner as in Example 1, except for using a pressure-sensitive adhesive containing no 2-phenyl-2-propanol which was prepared by dissolving 100 parts of polyisobutylene (Mw.: 870,000) in 700 parts of toluene.

Comparative Example 2

A surface protecting material was prepared in the same manner as in Example 1, except that 2-phenyl-2-propanol was not used.

Comparative Example 3

A surface protecting material was prepared in the same manner as in Example 1, except for changing the amount of the 2-phenyl-2-propanol to 10 parts.

Comparative Example 4

A surface protecting material was prepared in the same manner as in Example 3, except that 1,1-cyclohexanediol was not added.

Evaluation

1) Adhesive Strength (Initial and After Accelerated Weathering)

A coated plate having a base coat of an acrylic melamine resin paint (Magicron TB751, produced by Kansai Paint Co., Ltd.) and a topcoat of clear lacquer (Magicron TC Clear, produced by Kansai Paint Co., Ltd.) was prepared. Each of the surface protecting materials obtained in Examples and Comparative Examples was adhered to the coated plate by means of a laminator at 23° C. and 65% RH under a pressure of 70 N/cm at a speed of 5 m/min. After 30 minutes, the 180° peel strength (pulling speed: 300 mm/min) was measured to obtain the initial adhesive strength. Separately, the protective material stuck on the coated plate was subjected to accelerated weathering in Sunshine Carbon Weatherometer (manufactured by Suga Shikenki K.K.) for 100 hours in accordance with JIS D0205. After the weathering test, the sample was allowed to stand at 23° C. and 65% RH for 3 hours and then subjected to the same peel test to obtain the adhesive strength after accelerated weathering.

2) Weather Resistance

Test samples prepared in the same manner as in (1) above were fixed to an outdoor mount. After 30 days' and 90 days' exposure to natural weathering conditions, the surface protecting material was stripped off the coated plate to check any contamination of the coated plate. Samples which caused little contamination with a residual adhesive, etc. were judged good, and those caused perceptible contamination with a residual adhesive, etc. were judged no good.

3) Overall Judgement

Samples which had an adhesive strength, both initial and after accelerated weathering, in the range of from 2.5 to 8.2 N/20 mm in the peel test (1) and caused no contamination of the coated plate by adhesive remaining, etc. in the outdoor weathering test (2) were judged "pass", and those which failed to satisfy either one or both of these requirements were judged "failure".

The results of the evaluation are shown in Table 1.

TABLE 1

| | Adhesive strength (N/20 mm) | | Weather Resistance | | Overall |
|---|---|---|---|---|---|
| | Initial | After Accelerated Weathering | 30 Dys' Exposure | 90 Dys' Exposure | Judgement |
| Example 1 | 2.5 | 4.0 | good | good | Pass |
| Example 2 | 4.4 | 8.2 | good | good | Pass |
| Example 3 | 3.1 | 5.1 | good | good | Pass |
| Example 4 | 3.9 | 7.4 | good | good | Pass |
| Compara. Example 1 | 1.5 | 5.0 | good | good | Failure |
| Compara. Example 2 | 4.5 | 13.1 | no good | no good | Failure |
| Compara. Example 3 | 0.3 | 0.6 | good | good | Failure |
| Compara. Example 4 | 5.2 | 14.3 | no good | no good | Failure |

It is seen from Table 1 that all the samples of Examples have satisfactory initial adhesion, are prevented from increasing the adhesive strength with time, and exhibit excellent weather resistance, whereas the samples of Comparative Examples 1 and 3 have insufficient initial adhesion, and those of Comparative Examples 2 and 4 show a considerable increase in adhesive strength with time and have poor weather resistance. As is understood from comparison between Examples and Comparative Examples, a pressure-sensitive adhesive layer having well-balanced adhesion characteristics in initial adhesion, retention of the initial adhesion, and weather resistance can be obtained by compounding an isobutylene base polymer with a small amount of a release control agent showing high polarity due to oxygen atoms having large electronegativity.

While the invention has been described in detail and with reference to specific examples thereof, it will be apparent to one skilled in the art that various changes and modifications can be made therein without departing from the spirit and scope thereof.

What is claimed is:

1. A pressure-sensitive adhesive consisting essentially of 100 parts by weight of an isobutylene polymer and 0.002 to 2 parts by weight of at least one release control agent selected from the group consisting of an alcohol having a molecular weight of 90 to 300 and an oxygen atom content of 8.5% or more or esters formed from said alcohol and a carboxylic acid having a molecular weight of 70 to 400 and an oxygen atom content of 11% or more or salts or esters of said carboxylic acid.

2. The pressure-sensitive adhesive as claimed in claim 1, wherein said carboxylic acid is benzoic acid.

3. A surface protecting material comprising a substrate having thereon a pressure-sensitive adhesive layer comprising a pressure-sensitive adhesive consisting essentially of 100 parts by weight of an isobutylene polymer and 0.002 to 2 parts by weight of at least one release control agent selected from the group consisting of an alcohol having a molecular weight of 90 to 300 and an oxygen atom content of 8.5% or more or esters formed from said alcohol and a carboxylic acid having a molecular weight of 70 to 400 and an oxygen atom content of 11% or more or salts or esters of said carboxylic acid.

4. The pressure sensitive adhesive according to claim 1, wherein said carboxylic acid is triethylammonium.

5. The pressure sensitive adhesive according to claim 3, wherein said carboxylic acid is triethylammonium.

\* \* \* \* \*

UNITED STATES PATENT AND TRADEMARK OFFICE
CERTIFICATE OF CORRECTION

PATENT NO.    : 6,335,090 B1
DATED         : January 1, 2002
INVENTOR(S)   : Mitsuyoshi Shirai et al.

It is certified that error appears in the above-identified patent and that said Letters Patent is hereby corrected as shown below:

<u>Column 3,</u>
Lines 25-27, change "carboxylic acid" to -- ester of carboxylic acid --, and "triethylammonium" to -- triethylammonium benzoate --.

Signed and Sealed this

Thirteenth Day of April, 2004

JON W. DUDAS
*Acting Director of the United States Patent and Trademark Office*